July 10, 1951 T. VIGMOSTAD 2,560,496
FOLDABLE TOP FOR VEHICLE BODIES
Filed July 2, 1947 3 Sheets-Sheet 1
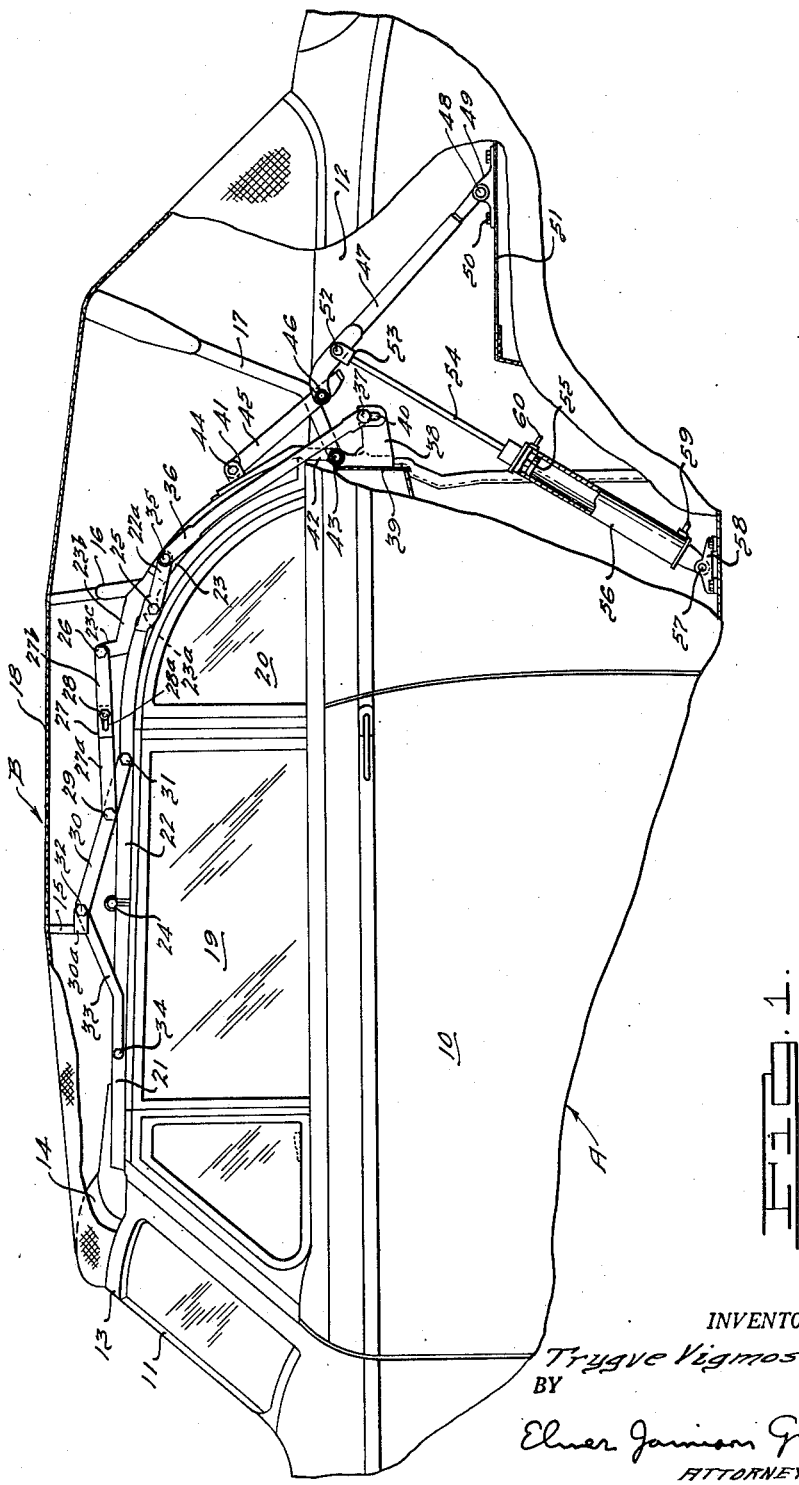
INVENTOR.
Trygve Vigmostad.
BY
Elmer Jamison Gray
ATTORNEY.

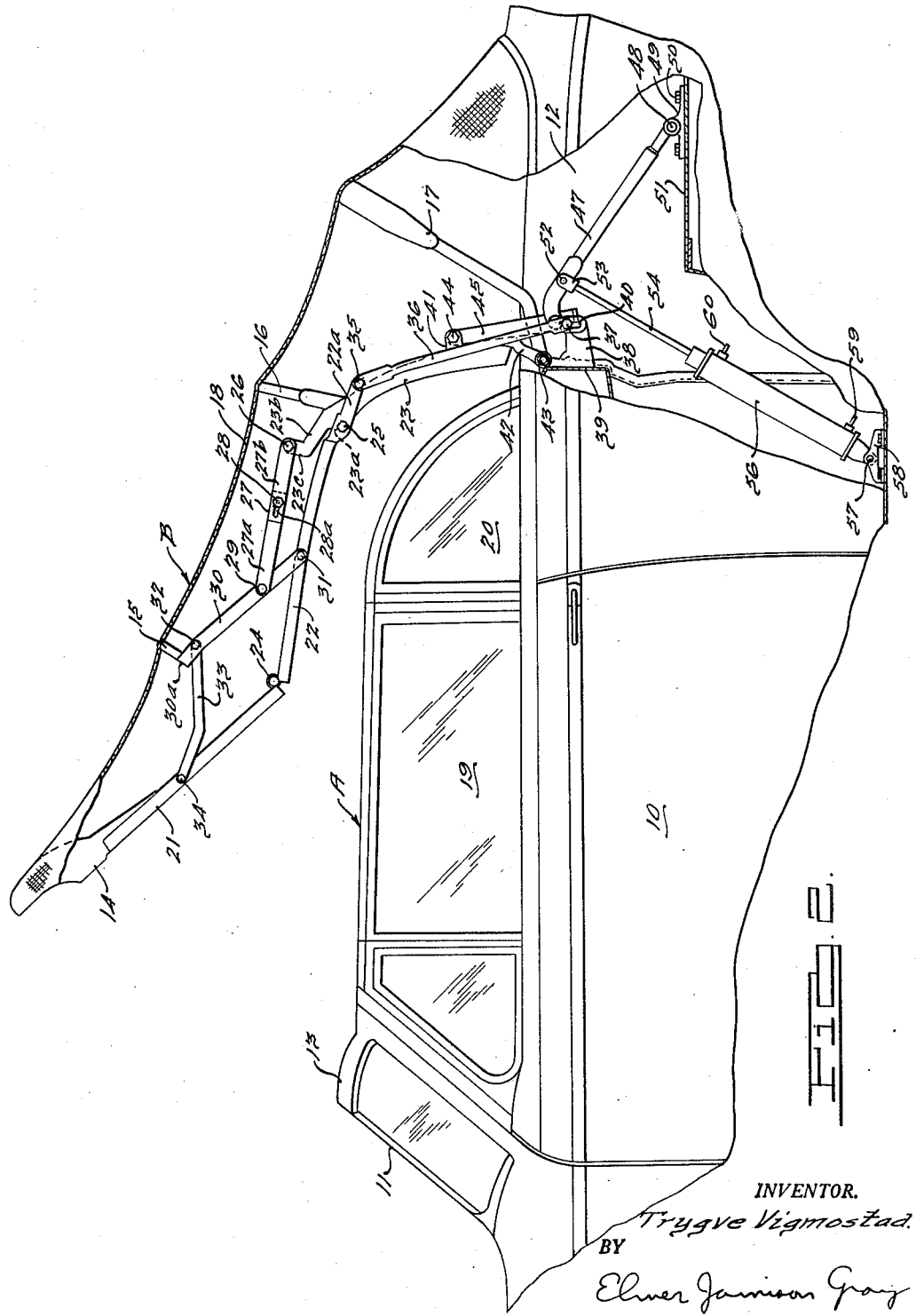

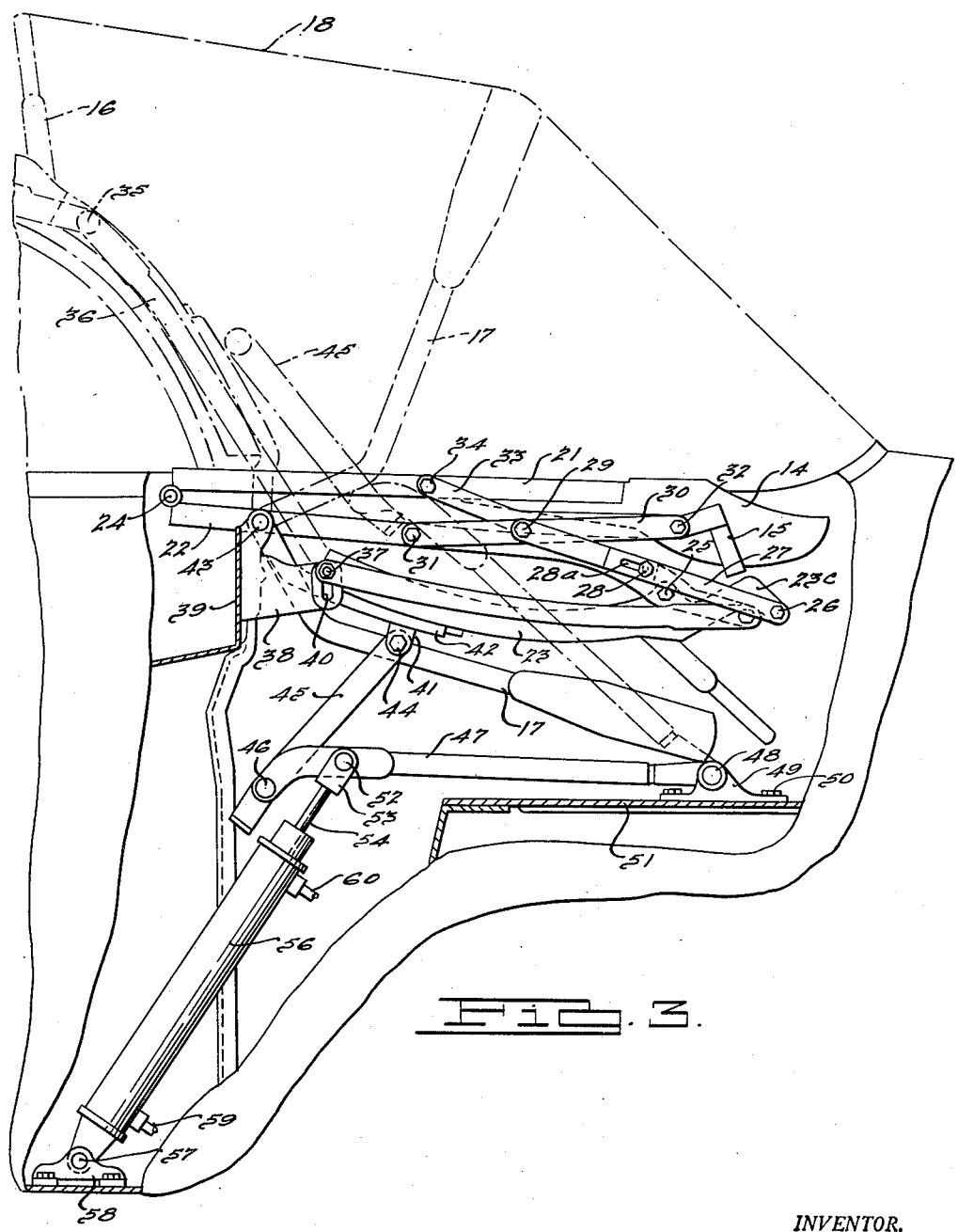

Patented July 10, 1951

2,560,496

UNITED STATES PATENT OFFICE 2,560,496

FOLDABLE TOP FOR VEHICLE BODIES

Trygve Vigmostad, Detroit, Mich., assignor to Briggs Manufacturing Company, Detroit, Mich., a corporation of Michigan Application July 2, 1947, Serial No. 758,582

2 Claims. (Cl. 296—116)

This invention relates to vehicle bodies and more particularly to automobile bodies of the so-called convertible type having foldable or collapsible tops.

An object of the invention is to provide an automobile or other vehicle body of the convertible type having a foldable top assembly, including a fabric covering, which is of improved construction capable of being positively unfolded into open position so as to assume the desired position with respect to the sides of the body and the windshield header thereof, and also capable of being folded or collapsed into the body as a compact unit occupying a minimum of space.

A further object of the invention is to provide a collapsible or foldable top for a vehicle body having improved operating mechanism effective to ensure positive movement of the top into full open position whereby the front end of the top may be readily locked or clamped to the windshield header of the vehicle.

Heretofore difficulties have frequently been encountered in connection with the operation of the convertible or foldable top mechanism, especially in the case of tops which are automatically opened or closed by means of power mechanism. One of these difficulties or disadvantages has been due to the fact that, when the top is unfolded or opened, the front transverse header of the top does not always travel to its final position in engagement with the fixed windshield header but instead comes to rest in a position spaced varying distances above the upper edge of the windshield header. When this occurs it is frequently difficult or impossible to lock the front end of the top to the windshield header without manual manipulation of the top so as to bring it down into engagement with the header. This disadvantage in operation is annoying since it often necessitates the car occupant getting out of the car and forcing the top down against the windshield header from outside the car and thereafter entering the car in order to lock the top in position.

One of the important objects of the invention is to overcome the foregoing disadvantages and difficulties encountered in prior constructions and to provide a foldable top assembly which will open fully and assume the correct position with respect to the windshield header, and also which will operate easily and positively at its extreme open and closed limits so that initiation of the folding and unfolding movements thereof may be effectively and speedily accomplished.

Still another object of the invention is to provide in an automobile body a collapsible or foldable top having improved link, lever and side rail mechanism so constructed and arranged as to function efficiently and positively between the full open and closed limits of movement of the top, and in addition to provide improved power actuated means for operating said mechanism.

Other objects of this invention will appear in the following description and appended claims, reference being had to the accompanying drawings forming a part of this specification wherein like reference characters designate corresponding parts in the several views.

Fig. 1 is a fragmentary side elevation, partly broken away and in section, illustrating a collapsible or foldable top for a vehicle body constructed in accordance with the present invention.

Fig. 2 is a view generally similar to Fig. 1 but illustrating the top in a partially folded condition.

Fig. 3 is an enlarged fragmentary side elevation, partly in section and partly broken away, illustrating the top in its folded or collapsed position within a compartment at the rear of the vehicle, a portion of the top when opened being shown in broken lines.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, a collapsible or foldable top constructed in accordance with one embodiment of the present invention as applied to a convertible body of the two door type. It will be understood, however, that the invention may be utilized in connection with other types of vehicles or automobile bodies, such as convertible bodies of the four door type. The body A is provided with a door 10 at each side, a windshield 11, and a collapsible or foldable top B adapted to be folded into a compartment or space 12 located between the rear seat of the body and the rear deck compartment, as illustrated in Fig. 3.

The windshield 11 terminates at its upper edge in a rigid transverse header 13, and the collapsible top B terminates at its forward edge in a transverse hollow header 14 adapted to engage the upper edge of the header 13 and to be clamped thereto by suitable manually operable mechanism located principally within the header 14 and actuated by means of a handle (not shown) accessible to the front seat passenger at a point above the windshield. When the header 14 of the foldable top is forced down into engagement with the upper edge of the windshield 13 it is preferably located in position by means of upright locating pins or studs on the header 13. The clamping mechanism for securing the header 14 of the foldable top to the windshield header 13 preferably includes slidable wedge elements engageable with the locating pins or studs on the header 13, and although the clamping mechanism may take any suitable form it is preferably constructed in accordance with United States Letters Patent No. 2,411,945, issued December 3, 1946.

The collapsible or foldable top B includes a front bow 15, an intermediate or middle bow 16, and a rear bow 17 over which the fabric 18 of the top is stretched. The opposite side edges of this fabric are attached to the foldable side rails forming a part of the top assembly and hereinafter more fully described. The front edge portion of the fabric 18 covers and is secured to the header 14 and the rear edge thereof is attached to the body around the upper rear edge of the compartment 12. Slidably mounted within the door 10 in the usual manner is a glass panel 19. Mounted within the body immediately in rear of the slidable panel 19 is a glass quarter panel 20 which is preferably mounted so as to move upwardly or downwardly into a well within the body.

Since the construction of the foldable top with reference to the side rails and operating linkage for the bows 15, 16 and 17 is the same at each side of the body, it will suffice to illustrate and describe the structure at one side of the body only. The foldable top is provided at each side with a sectional side rail extending from the header 14 to the rear of the body at a point adjacent the front upper edge of the compartment 12. This sectional side rail comprises a front rail section 21, an intermediate or middle rail section 22, and a rear rail section 23.

The rail sections 21 and 22 are arranged end to end in abutting relation when the top is open and are hinged together at 24 so that the front rail section 21 may fold back over the intermediate section 22 when the top is collapsed, as shown in Fig. 3. The rail section 22 is pivoted adjacent its rear end at 25 to a downwardly projecting offset portion 23a of the rear rail section 23. Rearwardly of the pivot 25 the rail section 22 has a lever or arm extension 22a which overlaps and crosses the upper part of the rear rail section 23, and the latter in turn is provided above the pivot 25 with a forwardly extending lever extension 23b which terminates in an upwardly offset arm portion 23c terminating at a point substantially above the intermediate rail section 22 when the top is in its open position.

The arm or lever extension 23b, 23c of the rear rail section 23 is connected to the front rail section 21 through the medium of a series of articulated links or bars as a result of which effort exerted by the rear rail section 23, when swung in one direction or the other, is transmitted to the front rail section so as to positively fold or unfold the same. Accordingly, there is provided a sectional link or bar 27 which comprises relatively endwise adjustable link members 27a and 27b which have their adjacent ends overlapped and adjustably connected together by means of a bolt and slot connection. The transverse bolt 28, forming part of this connection, is secured to the link member 27a and is slidable within a longitudinal slot 28a in the link member 27b, this bolt being rigidly clamped in adjusted position within the slot by means of lock nuts. Althought the link or bar connection 27 may be made in one piece, I prefer to form the same into the relatively adjustable link members 27a and 27b, as a result of which the link connection 27 is extensible in character so as not only to compensate for variations in production but also to enable the header 14 in the final open position of the top to assume the desired position with respect to the windshield header 13.

The member 27b of the extensible link connection 27 is pivoted at its rear end at 26 to the upper end of the offset arm portion 23c of the rear rail section. The forward end of the member 27a of this link connection is pivoted at 29 to an intermediate portion of a link 30. This latter link is pivoted at 31 to the intermediate rail section 22 at a suitable point between the ends thereof and in normal open position of the top extends forwardly and upwardly with respect to the side rail, as illustrated in Fig. 1. The inclined link 30 near its forward end is pivoted at 32 to a second inclined link 33 which is preferably elbow shaped so as to provide a portion extending downwardly and forwardly toward the front rail section 21 and a second portion extending parallel and alongside this rail section when the top is open. The forward end of the inclined link 33 is pivoted at 34 to the front rail section 21 at a suitable point between the ends thereof. Thus, it will be seen that the arm or lever extension 23b, 23c of the rear rail section 23 is operatively connected to the front rail section through the medium of the articulated links 27, 30 and 33. The link 30 has an extension 30a beyond the pivot 32 which is rigidly secured to an end of the front bow 15.

The intermediate bow 16 is secured at opposite ends to the rear side rail sections 23, each point of connection being preferably somewhat to the rear of the pivot 25 between each associated pair of intermediate and rear rail sections. The rearwardly extending arm or lever extension 22a of each intermediate rail section 22 is pivoted at its rear end at 35 to the upper end of a link or bar 36. In the normal open position of the top this link 36 extends downwardly and rearwardly alongside the rear rail section 23 and is pivoted at its rear end at 37 to a bracket 38 rigidly secured to a cross frame member 39 of the body. The pivotal connection between the link 36 and the bracket 38 is preferably adjustable so as to permit accurate installation of the top. This adjustable connection in the present instance comprises a bolt, forming the pivot 37, slidable within a vertical slot 40 in the bracket 38, the bolt being held in fixed adjusted position by means of lock nuts. Rigidly secured to the rail section 23 and forming a part thereof is a member 42 which extends downwardly and is pivoted at 43 to the bracket 38. By virtue of this construction it will be apparent that the rear rail section 23 will swing between the open and closed positions of the top about the pivot 43.

The foldable top in the present embodiment is operated through the medium of power actuated mechanism which may be either of the hydraulic or pneumatic type, and this mechanism is connected to the rear rail section 23 and to a fixed portion of the body in order to fold the top into the compartment 12, as shown in Fig. 3, or unfold and extend it to the open position shown in Fig. 1. The bracket member 42, which is rigidly secured to the rear rail section 23, is provided with an integral projecting ear 41 to which is pivoted at 44 the upper end of a link 45. This link near its lower end is pivoted at 46 to a relatively long link 47 which in turn is pivoted at its rear end at 48 to a bracket 49 bolted at 50 to the deck 51 of the compartment 12. The links 45 and 47 provide a pair of pivotally connected toggle links which articulate endwise and have their joint at the pivot 46. The link 45 is the chief operating link for the top assembly and operates the assembly through its connection at 44 with the rear rail section 23. Pivotally connected at 52 to the link 47, rearwardly of the toggle joint 46, is a clevis 53 which is secured to a piston rod 54. This piston rod is attached at its lower end to a piston 55 which is adapted to reciprocate within a cylinder 56. The lower end of the cylinder is pivotally connected at 57 to a bracket 58 bolted to a fixed part of the vehicle body. Accordingly, the cylinder 56 and piston rod 54 may swing as the top mechanism is operated in order to permit the toggle links 45, 47 to move into their proper positions and thus move the various elements of the top into their proper places both in the folded and unfolded positions of the top assembly.

The piston 55 and cylinder 56 may be of any suitable construction, either of the hydraulic or pneumatic type. In the present instance a hydraulic medium is utilized and fluid under pressure may be introduced at 59 to move the piston 55 upwardly within the cylinder for opening the top, and may be introduced at 60 to move the piston in the opposite direction for folding the top into the body.

In the foregoing description of the top assembly details of construction of the sectional side rails and associated parts have been omitted since they form no part of the present invention. Such construction in its preferred form is more fully shown and described in application Serial No. 714,779, filed December 7, 1946.

The hydraulic mechanism is controlled in conventional manner through a push button on the instrument panel. When the piston 55 and piston rod 54 are shifted outwardly the toggle link 47 is swung upwardly, thus shifting link 45 upwardly and in an endwise manner from the position shown in Fig. 3 to the position shown in Fig. 1. Link 45 transmits a force directly to the rear rail section 23. Unfolding motion of the middle rail section 22 is controlled by the rear rail section and link 36 acting through arm extension 22a. The front rail section 21 is unfolded and shifted positively to its full open position by the arm extension 23b, 23c of the rear rail section acting through link 27 which in turn acts upon link 33 through the connected link 30. The rear rail section thus transmits a force to the front rail section through the medium of links 27, 30 and 33 which also act to properly position the front bow 15. The reverse operation to the foregoing occurs when the hydraulic mechanism is actuated to fold the top assembly and shift it from the position shown in Fig. 1 to the collapsed position shown in Fig. 3.

I claim:

1. A foldable top for a vehicle body comprising a front side rail section, an intermediate side rail section hinged thereto, a rear side rail section hinged at its rear end to the body and having adjacent its forward end a downwardly offset portion to which the intermediate rail section is hinged, a pair of angularly related links pivoted together at a point above the front rail section, one link being pivoted at its forward end to the front rail section and the second link being pivoted at its rear end to the intermediate rail section, said rear rail section having an arm extension spaced outwardly of the hinge connection between the rear and intermediate rail sections, link means connecting said extension and said second link intermediate the ends of the latter, said intermediate rail section having a rearward extension beyond said hinge connection terminating at its end alongside said rear rail section and closely adjacent thereto, and a link pivotally connected to said end of said last named extension alongside the rear rail section and also pivotally connected to the body adjacent the rear end of the rear rail section.

2. A foldable top for a vehicle body comprising a front side rail section, an intermediate side rail section hinged thereto, a rear side rail section hinged at its rear end to the body and having adjacent its forward end a downwardly offset portion to which the intermediate rail section is hinged, a pair of angularly related links pivoted together at a point above the front rail section, one link being pivoted at its forward end to the front rail section and the second link being pivoted at its rear end to the intermediate rail section, said rear rail section having an arm extension spaced outwardly of the hinge connection between the rear and intermediate rail sections, link means connecting said extension and said second link intermediate the ends of the latter, said intermediate rail section having a rearward extension beyond said hinge connection terminating at its end alongside said rear rail section and closely adjacent thereto, and a link pivotally connected to said end of said last named extension alongside the rear rail section and also pivotally connected to the body adjacent the rear end of the rear rail section, the pivotal connection between said last named link and body comprising a fixed bracket on the body and means for adjusting said pivotal connection on said bracket in a vertical direction.

TRYGVE VIGMOSTAD.

REFERENCES CITED

The following references are of record in the file of this patent:

UNITED STATES PATENTS

| Number | Name | Date |
| --- | --- | --- |
| 961,687 | Cree | June 14, 1910 |
| 1,186,337 | Roush | June 6, 1916 |
| 1,459,406 | Lewis | June 19, 1923 |
| 1,511,570 | Lewis | Oct. 14, 1924 |
| 2,066,231 | Salmons et al. | Dec. 29, 1936 |
| 2,128,849 | Redfern | Aug. 30, 1938 |
| 2,213,222 | Keller | Sept. 3, 1940 |
| 2,264,602 | Westrope | Dec. 2, 1941 |
| 2,331,603 | Falcon | Oct. 12, 1943 |

FOREIGN PATENTS

| Number | Country | Date |
| --- | --- | --- |
| 5,336 | Great Britain | Nov. 12, 1914 |
| 177,456 | Great Britain | Mar. 30, 1922 |
| 236,742 | Great Britain | July 16, 1925 |